July 7, 1970  H. B. H. COOPER  3,519,064
METHOD FOR HEATING GASES
Filed July 17, 1968
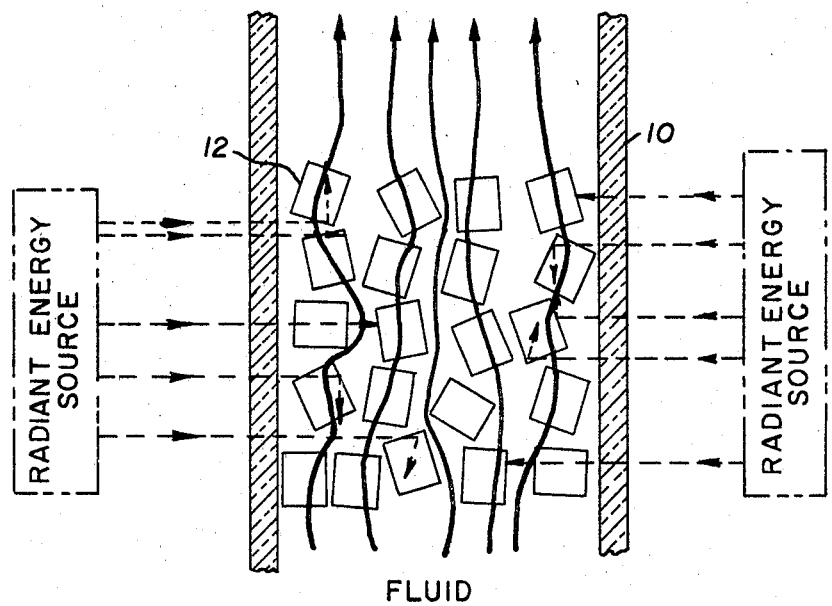
FLUID
*INVENTOR.*
HAL B. H. COOPER United States Patent Office 3,519,064
Patented July 7, 1970

3,519,064
METHOD FOR HEATING GASES
Hal B. H. Cooper, 4234 Chevy Chase Drive,
Pasadena, Calif. 91103
Filed July 17, 1968, Ser. No. 745,453
Int. Cl. F28d 3/00
U.S. Cl. 165—1                                    16 Claims

ABSTRACT OF THE DISCLOSURE

A method for heating a low radiation absorbing gas stream particularly volatile, highly corrosive inorganic halides by passing such stream through a thermal radiation heating zone defined by an outer substantially radiation-transparent fused quartz tube containing therein a plurality of radiation-absorbing surfaces provided by structure open to flow of the gas stream.

---

This invention relates to an improvement in method for the heating of corrosive materials.

Furnaces employing metal heat transfer ducts are generally not suitable for the heating of corrosive materials, such as volatile, highly corrosive inorganic halides to temperatures significantly above 500° C. Fused silica, or fused quartz, as it is more commonly known, has very desirable corrosion resistant qualities and is widely used for the heating of corrosive materials to elevated temperatures where metal cannot be employed. When silicon dioxide is fused at high temperatures, it can be converted from its original crystalline structure into an amorphous or non-crystalline glass, readily permitting its shaping into tubes. Fused quartz is available in either a clear (radiation transparent) or translucent (sometimes described as opaque) form.

Clear fused quartz is made from a high purity silicon dioxide, for example, naturally occurring quartz crystals. The translucent type of fused quartz is normally prepared from a specially treated silica sand. Both varieties are commercially available. Both varieties have a high silicon dioxide purity of in excess of 99.8%. One clear variety, widely marketed, has a silicon dioxide purity of about 99.97 to 99.98. The translucent variety of fused quartz, made from sand, typically has a purity of about 99.9 percent silicon dioxide. Impurities are present in larger amount in the translucent variety and are typically alumina, titania, iron oxide, and in lesser amount, CaO, $Na_2O$, $K_2O$, MgO and $Li_2O$.

Clear fused quartz tubing is generally fabricated with both surfaces smooth and essentially clear of bubbles. Translucent (or opaque) quartz, on the other hand, frequently contains a large amount of tiny bubbles within its body and one or both surfaces may be roughened from the forming operation, e.g., sand, satin, or glazed finish. The clear (radiation transparent) variety of fused quartz is decidedly stronger than the translucent type, being of the order of about 5 times stronger. This latter property of clear quartz is of significant importance in the fabrication of large structures built of fused quartz, for example, furnaces for the heating of corrosive gases on an industrial scale.

Many gases have a poor radiation absorptivity, this being especially so for those having symmetrical molecules, e.g., volatile inorganic chlorides such as silicon tetrachloride, boron trichloride and titanium tetrachloride, as contrasted with materials such as carbon dioxide and water which are highly absorptive to thermal radiant energy. When heating materials of low radiation absorptivity, the heat is necessarily transferred to the gas stream mainly by conduction and convection from a heat transfer surface rather than by radiation directly to or into the material.

Clear fused quartz is also a poor radiation absorbing material and, in fact, is an excellent transmitter of radiant energy. In the wave length range of 0.2 to 2.5 microns, which includes visible light and a major portion of the infra-red band, transmission is above 95 percent. Translucent (or opaque) fused silica, on the other hand, can absorb a substantial portion of the radiant energy passing into it, particularly at the longer wave lengths in the infra-red region; however, it also transmits a significant amount and is, therefore not 100 percent efficient in absorption. Rough outer surfaces increase the absorption or absorptivity of thermal radiation. For this reason, it has been heretofore considered necessary where heating corrosive materials, especially those of low radiation absorptivity, to employ translucent (or opaque) fused quartz tubing with a roughened surface in order to reduce the amount of heat transfer surface. Both transparent and translucent silica have a relatively low thermal conductivity. As a result of the low conductivity, the temperature difference across the quartz is necessarily high and, accordingly, the area for heat transfer is made large in order to achieve acceptable rates of heat transfer for industrial use.

Fused quartz devitrifies at an accelerated rate with increase in temperature levels. For example, at 1450° C. devitrification can occur in a relatively short time. Above 1000° C. devitrification becomes an important consideration in the use of fused silica as material of construction. Thus, it will be appreciated that where the gas stream is being heated to around 1000° C. and the quartz is at an elevated temperature, only relatively small temperature differences across the quartz wall can be tolerated, as otherwise devitrification sets in and the strength of the tube rapidly deteriorates and failures frequently occur.

It will thus be understood why, with the well-known fragility of fused quartz and the temperatures limitations that must be considered, that many problems of design and maintenance are encountered in its use. These, in turn, lead to very high furnace investment and maintenance costs, particularly where compared with more conventional heating systems where a metal heat transfer surface may be used.

It is a principal object of this invention to provide an improved method for heating corrosive materials, especially corrosive materials having poor radiation absorptivity.

It is a further object of the invention to provide an improved furnace having a lower initial capital investment and lower costs of maintenance.

It is a still further object of the invention to provide an improved method for heating more material per unit length of heating conduit than by methods of the prior art.

It is a further object of the invention to provide a more compact furnace structure requiring considerably shorter lengths of heating conduit to effect the same heating requirement.

It is an important advantage of the invention to provide an improved structure of greater strength and lesser fragility.

It is a still further object of the invention to provide an improved fused quartz conduit structure less subject to devitrification and of longer life expectancy.

It is an additional object of the invention to provide a fused quartz conduit structure permitting more ready heating of gases at elevated pressures.

It is another object of the invention to provide a fused quartz structure wherein a substantial portion of the radiant energy falling on the outside surface of the structure is transferred internally for heating the fluid without intermediate conduction of the heat through the outer containing walls of the conduit.

It is a further object of the invention to provide a fused quartz structure comprising an outer radiation-transparent fused quartz tube having within structural components capable of absorbing a very substantial portion of the thermal radiation falling on and passing through the outer tube.

It is another object of the invention to provide a fused quartz structure having an exceptionally high radiation-absorbing and heat transfer area per unit length of the heating conduit, thus permitting a shorter length for heat transfer, lower gas velocities, and low pressure drop for the fluid being heated.

It is an object of the invention to provide an improved fused quartz conduit structure made up of an outer, substantially radiation-transparent fused quartz tube containing an inner radiation-absorbing zone in which there is disposed a larger number of radiation-absorbing surfaces which both absorbs the radiant energy and then transfers the resulting heat to the fluid flowing therethrough.

The method of the invention is especially suited for the heating of a gas stream containing molecules having poor radiation absorption characteristics. The method includes passing the gas stream being heated through a tubular heating zone having an outer substantially radiation-transparent fused silica wall, which tubular heating zone is exposed to an external radiant energy heating source. The heating zone inside the outer fused silica wall through which the fluid being heated is passed, is filled with a plurality of radiation absorbing surfaces which present many faces disposed at various angles which assures substantially full absorption of all energy striking the heating zone. The radiant energy, largely in the infrared range, passes through the outer radiation-transparent tube wall with little absorption, through the low radiation-absorbing fluid being heated, and strikes the surface of the inner structures, where it is absorbed, or partially reflected to other parts of the structures for absorption, and is transformed into heat. The heat absorbed by the structures is thereupon transferred to the gas stream by conduction and convection. The inner radiation absorbing structure or structures are preferably open in configuration with a high surface area and disposed or placed so that the heat from the radiant energy absorbed is readily transferred to the flowing gas stream, thereby giving a very high absorption of the radiant energy originally passing through the outer radiation transparent tube. Any radiant energy absorbed by the fluid as it passes through it, naturally, heats the fluid directly.

The radiation absorbing structures, which are typically randomly disposed, may be of many shapes and configurations, but typically are provided by beads, balls, chunks, Raschig rings, Berl saddles, broken pieces, and open grids of materials which are highly absorbent to the radiant energy falling on their surface and resistant to corrosion by the fluid being heated. Serrated or roughened surfaces aid the absorption of the thermal radiation and its subsequent transfer to the flowing fluid being heated. Suitable materials of construction include silica, alumina, certain clays, Carborundum (silicon carbide), refractory metal carbides and oxides, alumina-silicates, and certain other metal salts of silicates and aluminates. Translucent or opaque quartz is a particularly suitable material for these structures, since it is also chemically compatible with the outer radiation-transparent conduit at elevated temperatures.

In view of the importance of keeping the weight of the radiation absorbing structure low so as to simplify design problems, the structures are preferably made in configurations that are hollowed, thin walled, and of foamed materials. Such shapes also provide a greatly increased amount of heat transfer surface, along with lower bulk density. Raschig rings or Berl saddles are preferred shapes because of their high surface area, low bulk density, open structure, and random disposition of the radiation absorbing surfaces, which latter results in essentially all of the high temperature radiant energy which passes through the outer radiation-transparent wall eventually becoming absorbed within the structures and being transferred to the fluid being heated. Such structures permit the transfer of the heat from the absorbed radiant energy from both sides to the flowing fluid being heated, as well as fairly deep penetration of the radiant energy toward the center of the tube.

The major advantages of the structure of the invention over presently used structures employing translucent single tubes may be translated into more fluid being heated per unit length of heating conduit, heating the fluid to higher temperatures or, conversely, a shorter length of heating conduit for the same heating duty. The improved structure of the invention allows much smaller and lower cost furnaces to effect the same heating duty and makes possible a major reduction in maintenance costs.

The same advantages prevail with regard to the structure and invention of Ser. No. 584,480 (filed Oct. 5, 1966), but to a somewhat lesser extent. The invention of Ser. No. 584,480 offers an advantage of the order of 2 to 1 over the structures of prior art commercial practice, which utilize radiation-absorbing conduits and transfer of the heat being absorbed through the outer quartz wall to the flowing fluid on the inner surface.

Both the prior art and the invention of Ser. No. 584,480 require the employment of relatively small diameter tubes in order to achieve high gas velocities so as to obtain acceptable gas-side heat transfer coefficients to the flowing fluid, since the radiation absorbing and heat transfer area is limited. The tubes must be, accordingly, of considerable length, with the attendant furnace design problems. On the other hand, with the structure of the invention, there is a major increase in the inner heat transfer surface, A, thus making possible a much greater rate of heat transfer to the fluid being heated. As shown by the generalized equation for heat transfer, which follows:

$$Q = UA\Delta T$$

where

Q = heat transferred per unit time
U = overall heat transfer coefficient
$\Delta T$ = temperature difference
A = area heat transfer surface Q increases directly as the area when U and $\Delta T$ remain the same. However, in view of the major increase in inner heat transfer surface, A, there are also the new options of employing lower temperatures and lower gas velocities, since U is mainly a function of the velocity of the fluid flowing and being heated. The former option is important in view of being able to reduce the problems of devitrification and low strength of fused silica at elevated temperatures; and the second permits the use of lower velocities and, accordingly, an increase in the diameter of the outer tube. This latter offers the advantage of allowing more thermal radiation to fall on and enter the outer radiation-transparent tube for transfer to the fluid being heated. The net of this is that a major increase in heat transfer results which directly translates to shorter lengths of heating conduit being needed for a given heat transfer duty and/or a lesser temperature driving force. Compared with the present commercially employed translucent silica outer tube concept, the combination of increased heat transfer area and larger diameter outer radiation-transparent tube can provide an increase in heat transferred per unit length of the order of about 4-fold or more. This dramatic improvement over the prior art readily illustrates the reduction is furnace size and cost that is possible through the practice of the invention.

The lower temperature gradient (driving force) employed across the wall of the transparent fused quartz tube of the invention compared to that required by the translucent tube of the prior art, permits a lower temperature operation of the fused quartz tube, thus increasing life and strength of the quartz structure, since devitrification and loss of strength is less at lower temperatures. The latter advantage is particularly important where the fluid being heated is under pressure, since, at best, the structural strength of fused quartz is not outstanding. Higher fluid operating pressures can thus be employed, for instance, in the heating of titanium tetrachloride which is of considerable commercial importance.

The physical characteristics of some typical radiation absorbing structures are listed in the table below:

| Packing | Percent free space | Specific surface, ft.$^2$/ft.$^3$ | Bulk Density, lbs./ft.$^3$ |
|---|---|---|---|
| 1 in. Raschig rings | 68 | 58 | 45 |
| 1 in. Berl saddles | 69 | 79 | 42 |
| 1 in. Stoneware balls | 40.8 | 43 | 80-90 |

The advantages of open end high surface type structures such as Raschig rings and Berl saddles over solid structures such as balls or chunks is readily apparent. In addition to the advantages of greatly increased heat transfer surface, there is the further advantage that the more open structure results in a lower pressure drop which is of great importance when heating corrosive gases to elevated temperatures in fused quartz.

The method and structure of the invention are particularly suitable for the heating of various volatile inorganic halides to elevated temperatures. Typically, the halides heated in the conduit structure of the invention have relatively low boiling points of up to around 500° C., usually less than 400° C. The process of the invention offers special advantages for the heating of materials such as boron trichloride, silicon tetrachloride, and titanium tetrachloride. The process may also be employed for the heating of various halogens in elemental form, for example, bromine, chlorine, and iodine, or their acids, such as hydrogen bromide, hydrogen chloride, and hydrogen iodide. The process is especially suitable for the heating of various metallic halides, in particular the fluorides, chlorides, bromides and iodides of aluminum, boron, iron, titanium, silicon, vanadium, tungsten and zirconium. The structure and process may also be utilized for the heating of other gases of low radiation absorptivity, such as oxygen, nitrogen, hydrogen and neon. Other prospective inorganic halide fluid streams that may be heated to advantage include the fluorides, chlorides, bromides and iodides of beryllium, bismuth, gallium, germanium, indium, mercury, molybdenum, and uranium. Other low boiling halides are those of niobium, osmium, rhenium, and the halides of phosphorus including the bromide, chloride and iodide.

The objects and advantages of the structure and method of the invention will become apparent from the description and drawing which follow:

The accompanying drawing portrays a cross-sectional schematic view of the fused quartz structure of the invention when using Raschig rings as the radiation-absorbing and heat transfer structures and illustrates the mechanism by which the improvement in heat transfer is effected.

The conduit illustrated in the drawing is designed for use in furnaces employing either electricity or the combustion of a fuel gas. For the case of the former, the furnace may be heated by electrical heaters located along the side walls of the furnace adjacent to the quartz tube conduit, or immediately around the tube. For the latter, a conventional furnace wherein gas burners empty their hot exhaust gases into the interior of the furnace and thereby provide radiant energy for heating of the gas streams passing through the conduit of the invention, may be used.

The conduit of the invention comprises an outer, substantially radiation-transparent fused quartz tube 10 which is randomly packed with a multitude of radiation-absorbing structures 12 which typically may be Raschig rings, or Berl saddles, or the like. Radiant energy passes through the outer transparent fused quartz tube and in striking the Raschig rings or other radiation-absorbing members 12 is absorbed. By employing a plurality of radiation-absorbing members 12, reflected energy or radiation not absorbed initially will be likely absorbed by adjacent members. The radiation-absorbing members 12 are preferably open in structure so as to minimize the obstruction to the flow of the gases being heated through the conduit and to provide both a large amount of radiation-absorbing area which, in turn, serves to transfer the heat from the radiant energy absorbed to the fluid flowing adjacent to it and being heated. The surfaces of the radiation-absorbing members are, of course, radiating back, but at a much lower temperature level, since heat is being removed by the fluid flowing past by conduction and convection.

The transfer of heat at high temperature levels, for example, 900° C., is much more effective and efficient by radiation, which characteristic is utilized in the foregoing tube structure, than by conduction and convection, which latter is the rate-controlling step of structures of the prior art. Transfer of heat by radiation takes place by the fourth power of the differences in temperature and is expressed by the familiar Stefan-Boltzmann equation, Equation 1.

(Equation 1) $Q = AK(T_1^4 - T_2^4)$

Transfer of heat by conduction and convection, on the other hand, takes place only by the first power difference of the temperature and is expressed by Equation 2.

(Equation 2) $Q = AC(t_1 - t_2)$

Q = heat transferred in thermal units/hour
$T_1, t_1$ = high level temperature
$T_2, t_2$ = low level temperature
A = area of heat transfer surface
K and C = appropriate coefficients Since heat transfer to the fluid being heated is thus controlled by this latter mechanism, the importance of the greatly increased amount of heat transfer area provided by the plurality of inner radiation-absorbing structures and its direct reflection in a larger Q is apparent, as is the fact that the larger area also permits the employment of a lower $T_2$ and $t_1$ and a lower temperature for the outer fused quartz conduit, than provided by prior art methods.

In most cases, the furnace tube length can be shortened to more than one-half, in general to about one-third, and the furnace size decreased accordingly from present industrial practice. Alternatively, very much increased capacities can be obtained from the same furnace size. Thus, it is seen that with the structure of the invention fused quartz becomes a much more satisfactory, useful and economic material of construction.

Other advantages over the prior art include the ability to employ clear fused quartz with its greater strength, lower temperature of operation for the outer fluid containing tube, thereby giving longer life through less tendency of the fused quartz to devitrify, and significantly reduced maintenance costs for repair and replacement.

Having thus described this invention fully and completely as required by the patent laws, it will be apparent to those skilled in the art that other variations are possible. The practice of the invention is to be limited only by the scope of the following claims.

I claim:
1. A method for the heating of a gas stream of low radiation absorptivity, said method comprising:
    passing the low radiation absorbing gas stream through a heating zone defined by an outer substantially radiation-transparent fused quartz tube containing therein a plurality of radiation-absorbing surfaces provided by structure open to flow of the gas stream;
    exposing the heating zone to a source of thermal radiation, said thermal radiation passing through the outer radiation-transparent tube with little absorption, through the low radiation-absorbing fluid being heated, and striking the radiation-absorbing surfaces to effect a heating thereof; and transferring heat from the heated surfaces to the gas stream via conduction and convection.

2. A method in accordance with claim 1 wherein the radiation-absorbing surfaces are formed of a material selected from a group consisting of silica, alumina, zirconia, carbon, silicon carbide, alumina-silicate, clay, ceramic, refractory metal oxides, carbides, aluminates and silicates.

3. A method in accordance with claim 1 wherein the radiation-absorbing structure is formed of a low-density, foamed composition.

4. A method in accordance with claim 1 wherein the plurality of radiation-absorbing surfaces are provided by randomly disposed open packings.

5. A method in accordance with claim 4 wherein the open packing is selected from the group consisting of Raschig rings, Lessing rings, spiral rings, cross partition rings, Berl saddles, Intalox saddles, spheres, cylinders, pieces and chunks.

6. A method in accordance with claim 1 wherein the gas being heated is a volatile inorganic halide.

7. A method in accordance with claim 1 wherein the gas being heated is a metallic halide from the group consisting of aluminum, boron, iron, titanium, silicon, vanadium, and zirconium.

8. A method in accordance with claim 1 wherein the gas being heated is a halogen selected from the group consisting of chlorine, bromine and iodine.

9. A method in accordance with claim 1 wherein the gas being heated comprises symmetrical molecules.

10. A method in accordance with claim 1 wherein, the gas being heated is oxygen.

11. A method in accordance with claim 1 wherein the gas being heated is a hydrogen halide selected from the group consisting of hydrogen chloride, hydrogen bromide and hydrogen iodide.

12. A method in accordance with claim 1 wherein the gas being heated is titanium tetrachloride.

13. A method in accordance with claim 1 wherein the gas being heated is silicon tetrachloride.

14. A method in accordance with claim 1 wherein the gas being heated is boron trichloride.

15. A method in accordance with claim 1 wherein the gas being heated is aluminum chloride.

16. A method in accordance with claim 1 wherein the gas being heated is iron chloride.

References Cited

UNITED STATES PATENTS

| | | | |
|---|---|---|---|
| 2,690,051 | 9/1954 | Peskin | 165—104 |
| 3,020,032 | 2/1962 | Casey | 263—42 |

ROBERT A. O'LEARY, Primary Examiner

CHARLES SUKALO, Assistant Examiner

U.S. Cl. X.R.

263—42